Dec. 16, 1924.
A. LLOYD
1,519,586
VENTING MOLD
Filed June 2, 1922  2 Sheets-Sheet 1
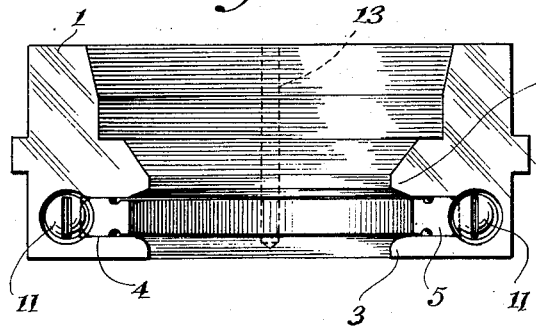
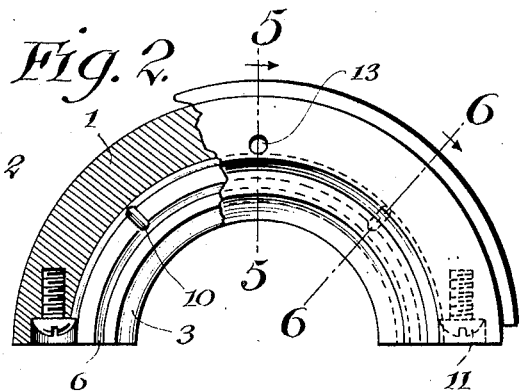
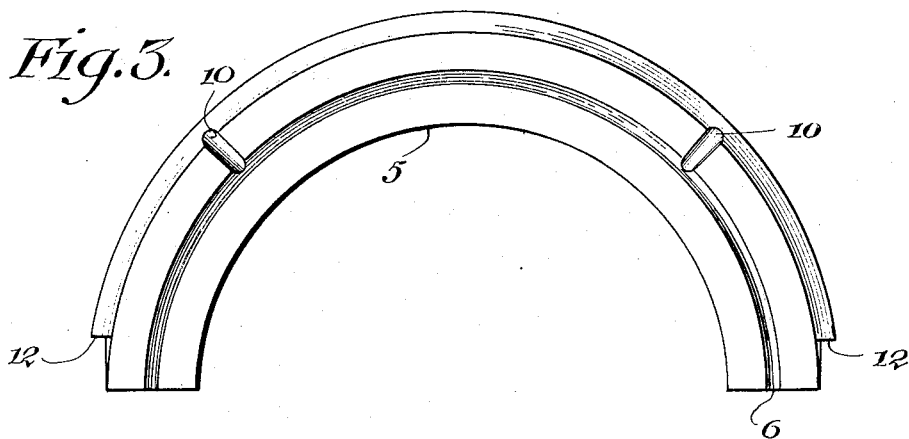
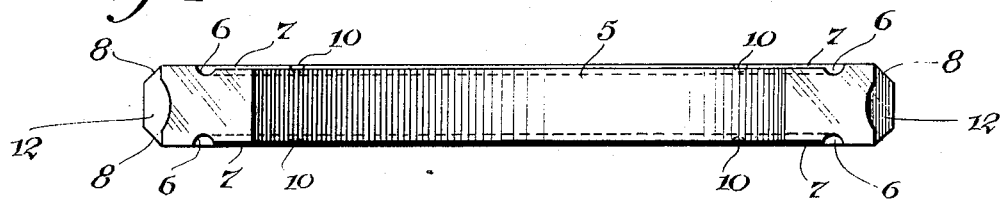
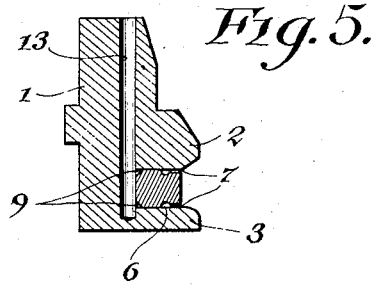
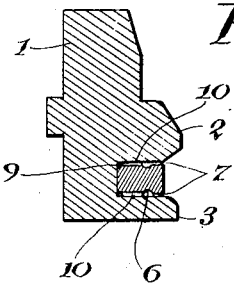
Inventor
ALPHONZO LLOYD.
Eccleston & Eccleston
Attorneys

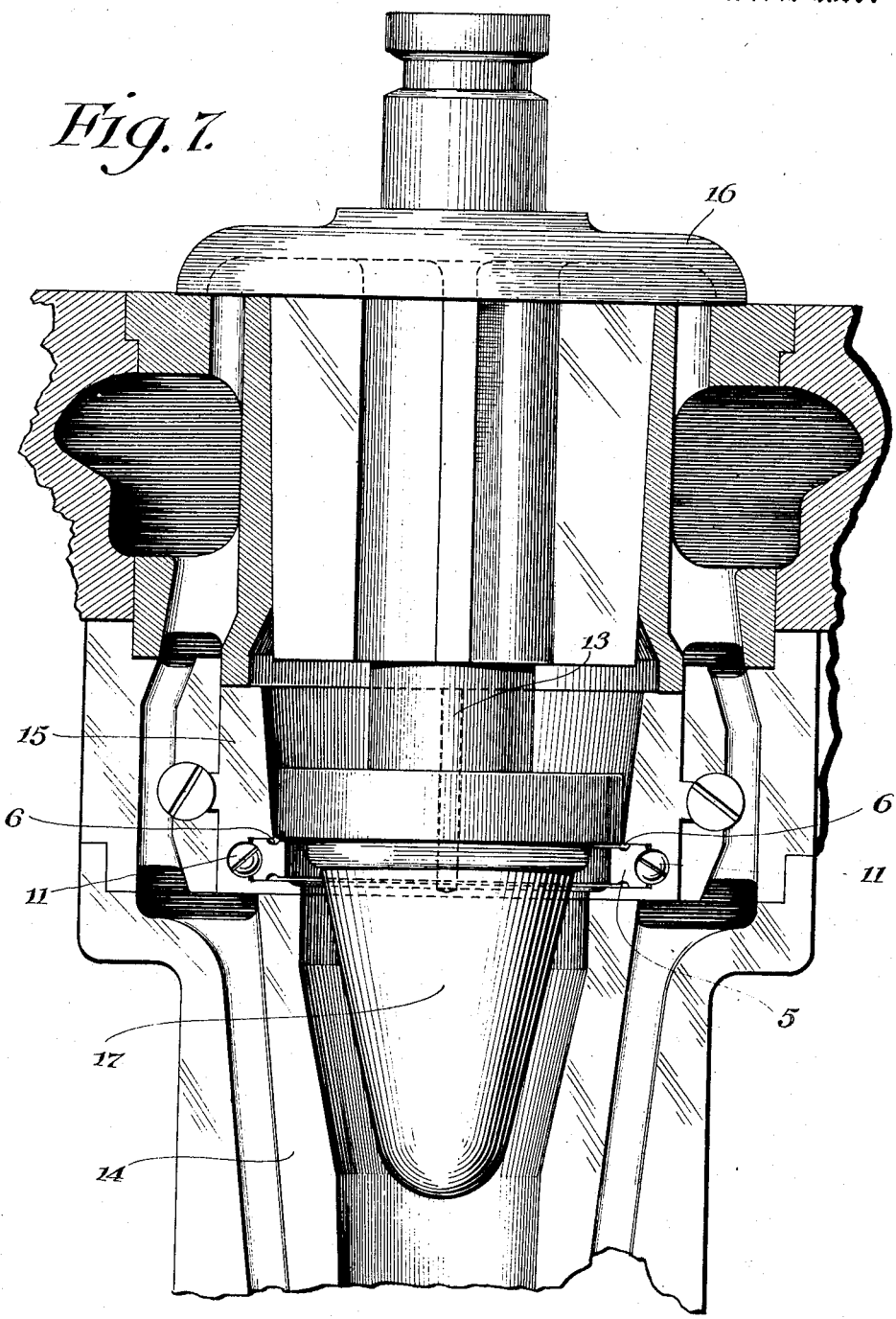

Patented Dec. 16, 1924.

1,519,586

UNITED STATES PATENT OFFICE.

ALPHONZO LLOYD, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA.

VENTING MOLD.

Application filed June 2, 1922. Serial No. 565,373.

*To all whom it may concern:*

Be it known that I, ALPHONZO LLOYD, a citizen of the United States, and a resident of Washington, in the county of Washington and State of Pennsylvania, have invented certain new and useful Improvements in Venting Molds, of which the following is a full, clear, and exact description.

The invention relates to improvements in venting molds, whereby air which may become entrapped in relatively deep recesses or beads, will be positively withdrawn, thus permitting the glass to have close contact with the entire surface of the mold and avoiding deformations in the manufactured articles.

The invention, while not limited to the manufacture of glass articles, is primarily intended for such use, and is particularly adapted for use in connection with that method of manufacture in which the glass blank is sucked into the mold.

In the manufacture of glass articles one well known method of gathering the glass consists in sucking the glass blank into the mold. For example, in the manufacture of glass bottles the blank molds are brought into close proximity to or into contact with the molten glass, and the air is then exhausted from the molds, thereby causing the molten glass to be sucked into the blank molds to fill the same, and the neck portion of the blank will be shaped to substantially the shape of the finished bottle, while the core or plunger will make an initial blow opening or cavity in the top of the blank.

This well known method of manufacture has one very serious disadvantage when it is used in the manufacture of glass articles provided with flanges or beadings of any considerable depth. This disadvantage results from the fact that the molten glass sucked into the mold often entraps the air in the mold recesses, thereby preventing the glass from coming into close contact with the surface of the mold, and thus causing depressions or deformities in the manufactured articles.

The invention will be shown and described herein as applied to the manufacture of glass bottles, particularly the bottle necks, but it will be apparent that the invention is of much more general application, and is adapted to use in connection with the manufacture of any type of glass articles having relatively deep flanges or beadings, and in the manufacture of which the glass is initially sucked into the molds.

I will now proceed to describe one particular form of my invention, it being understood that those skilled in the art may make many changes and modifications therein without departing from the spirit of my invention as defined in the appended claims; and the drawings forming part of this specification are, therefore, to be considered merely as illustrative, and not in any limiting sense.

In the drawings:

Figure 1 is a front elevation of one section of a neck mold, with a section of the ring mounted therein.

Figure 2 is a plan view of the neck mold, the mold being partly broken away and showing a portion of the ring in plan.

Figure 3 is a plan view of one of the ring sections removed from the mold.

Figure 4 is a front elevation of one of the ring sections removed from the mold.

Figure 5 is a vertical transverse sectional view taken on line 5—5 of Figure 2.

Figure 6 is a vertical transverse sectional view taken on line 6—6 of Figure 2, and Figure 7 is a vertical sectional view through a portion of an ordinary bottle making machine provided with the ring; the neck mold differing in shape from that shown in Figure 1.

Referring to the drawings more in detail, numeral 1 indicates a section of a mold which may be of any desired form, but for the purpose of illustrating the invention I have selected a neck mold used in the manufacture of bottles. These molds are usually made in two sections, though, so far as the present invention is concerned, it is immaterial how many sections constitute the mold.

Referring particularly to Figures 1, 2, 5 and 6, the mold section is provided with two inwardly extending flanges 2 and 3, forming therebetween a deep annular channel 4, and mounted in this annular channel is a ring 5, the construction and function of which will appear hereinafter. In the mold construction thus far described a relatively deep recess extends entirely around each of the half mold sections, and it is this annular recess that forms the beading or flange commonly found on bottle necks.

In the manufacture of glass articles by the method in which the glass blank is sucked into the mold, it will be apparent that air is liable to be entrapped in recesses of the character just described, and when air is thus entrapped it results in a deformation of the manufactured article.

I will now describe the means which I have devised for positively removing air from the recesses in the molds, thus insuring a close contact of the glass with the entire surface of the mold.

Numeral 5 refers to the ring generally, which in the present instance is formed of two complemental half sections, each half section adapted to be received in one of the mold half sections in the manner previously described.

An annular groove 6 is cut in the top and bottom of the ring, and these grooves communicate with the interior of the mold by means of a vent space indicated by numeral 7. This space is formed by the removal of material from the normal fitting surface of an amount to form a very slight depression; the vent space thus formed being large enough to permit the removal of entrapped air, but not large enough for the molten glass to be sucked therein, forming a fin or sharp ridge of glass. Of course, the depth of the vent passage may be varied within limits, but ordinarily the depth thereof will be from .002″+ to .003″−.

The outer periphery of the ring is beveled at the top and bottom, as indicated by numeral 8, and these beveled portions, in conjunction with the walls of the channel 4 in the neck mold, form passages 9 extending around the periphery of the ring at the top and bottom thereof.

For the purpose of establishing communication between the annular grooves 6, 6 and the annular passages 9, 9, I have provided transverse channels 10, 10. I have shown each half section of the ring as provided with two of the transverse channels on each side; but it will be understood, of course, that I may employ any desired number of these transverse channels.

Various means may be provided for securing the ring section in the mold section; the specific means herein illustrated consisting of set-screws 11, 11 mounted in the mold section and engaging shoulders 12, 12 formed on the ring section.

A vertical passage 13 is drilled or otherwise formed in the mold section and is arranged to communicate with the top and bottom annular passages 9, 9.

The operation of the apparatus thus far described is as follows:

When suction is applied to the interior of the mold to draw the glass and form a blank, a part of that suction is also applied simultaneously to and through the vertical passage 13. The vertical passage 13 communicates with the annular passages 9, 9 and the annular passages 9, 9 communicate with the annular grooves 6, 6 by means of transverse channels 10, 10; and the annular grooves 6, 6 communicate with the interior of the mold by means of the vent spaces 7, 7. It is thus apparent that any air entrapped in the relatively deep recess forming the beading will be positively removed therefrom, and the glass will make close contact with the mold at all points.

Figure 7 shows a portion of a bottle making machine of that type in which the glass blank is sucked into the mold. The general arrangement is well known in the art and the construction will, therefore, be described in a very general way only.

Numeral 14 indicates the blank mold, and arranged above the blank mold is the neck mold 15. Communicating with the interior of the neck mold and blank mold is a suction cap 16, and the core or plunger 17 causes the initial blow opening in the top of the blank. The neck mold has mounted therein the ring 5 which is identically the same as the ring previously described, and the vertical passage 13 communicating with the annular passages is also provided in the neck mold.

In the construction illustrated in Figure 7 air is exhausted from the blank and neck molds in the well known manner through the suction cap 16; but the suction applied will also act through the vertical passages 13 to positively withdraw any air entrapped in the relatively deep beading recess; and in the specific arrangement of the ring 5 relative to the neck mold 15 in Figure 7 the suction applied through the cap 16 also acts directly on the annular groove 6, thereby further assisting in removing the entrapped air.

While I have described a specific means to prevent air from being entrapped in the beading recess of a bottle neck mold, it is to be clearly understood that the construction is subject to wide modification and the invention is of sufficient scope to include any means for positively withdrawing the air from relatively deep recesses; and it is immaterial, so far as this invention is concerned, what the glass article being manufactured may be, or where the beadings or flanges may be formed on the manufactured article.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described my invention, what I claim as new and desire to secure by Letters Patent is:

1. A mold for glass articles, said mold being provided with an annular recess, a member projecting into said recess and spaced slightly from one wall thereof to form a vent space communicating with the interior of the mold, and air exhausting means communicating with the vent space.

2. A mold for glass articles, said mold being provided with an annular recess, a member projecting into said recess and spaced slightly from the top and bottom wall thereof to form upper and lower vent spaces, and air exhausting means communicating with the vent spaces.

3. A mold for glass articles, said mold being provided with an annular recess, a member projecting into said recess and spaced slightly from the top and bottom walls thereof to form upper and lower vent spaces, said member having an annular groove in the top and bottom thereof communicating with the vent spaces, and air exhausting means communicating with the annular grooves.

4. A mold for glass articles, a ring inserted in said mold adjacent a recess therein, and means associated with said ring for exhausting air from said recess.

5. A mold for glass articles, a ring mounted in the mold, said ring being provided with an annular groove, air exhausting means communicating with said groove, and said groove communicating with the interior of said mold.

6. A mold for glass articles, said mold provided with an annular channel, a ring mounted in said channel, the outer periphery of said ring being beveled whereby an annular passage is provided between the mold and the periphery of the ring, air exhausting means communicating with said passage, and said passage communicating with the interior of the mold.

7. A mold for glass articles, said mold provided with an annular channel, a ring mounted in said channel, the arrangement being such that a passage is provided between the outer periphery of the ring and the walls of the mold, air exhausting means communicating with the passage, and said passage communicating with the interior of the mold.

8. A mold for glass articles, a ring mounted in said mold, the construction and arrangement being such that a vent space communicating with the interior of the mold is provided on one side of the ring, an annular groove communicating with the vent space, and air exhausting means communicating with the annular groove.

9. A mold for glass articles, a ring mounted in said mold, the construction and arrangement being such that a vent space communicating with the interior of the mold is provided on each side of the ring, and air exhausting means communicating with the vent spaces.

10. A mold for glass articles, a ring mounted in said mold, said ring being provided with an annular groove in the top and bottom therof, said groove communicating with the interior of the mold, a vertical passage provided in said mold, said passage communicating with the annular grooves.

11. A mold for glass articles, a ring adapted to be mounted in said mold, the construction and arrangement being such that a vent space communicating with the interior of the mold is provided on one side of the ring, said ring having an annular groove communicating with the vent space, the outer periphery of the ring being beveled, whereby an annular passage is provided between the periphery of the ring and the wall of the mold, the ring being provided with transverse channels connecting the annular groove with the annular passage, and the mold being provided with a substantially vertical passage communicating with the annular passage.

12. A mold for glass articles, a ring adapted to be mounted in said mold, the construction and arrangement being such that a vent space communicating with the interior of the mold is provided on each side of the ring, said ring having an annular groove on each side thereof and communicating with the vent spaces, the outer periphery of the ring being beveled at the top and bottom thereof, whereby two annular passages are formed, one of said passages communicating with the upper vent space and the other of said passages communicating with the lower vent space, and the mold being provided with a substantially vertical passage communicating with both of the annular passages.

ALPHONZO LLOYD.